April 7, 1959 G. F. ROGERS 2,881,400

ATTENUATOR CIRCUIT

Filed April 20, 1956

INVENTOR.
Gordon F. Rogers
BY Morris L. Rabin
ATTORNEY.

United States Patent Office 2,881,400

Patented Apr. 7, 1959

2,881,400

ATTENUATOR CIRCUIT

Gordon F. Rogers, Lincolnwood, Ill., assignor to Radio Corporation of America, a corporation of Delaware Application April 20, 1956, Serial No. 579,665

4 Claims. (Cl. 333—81)

Figure 1:
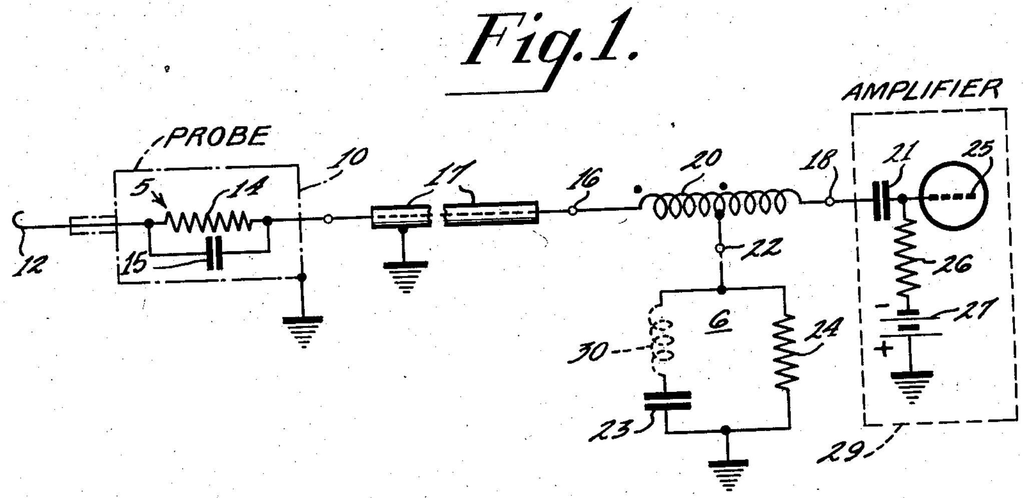

The present invention relates to improvements in electrical circuits adapted to operate with signals over a wide band of frequencies, and more particularly to improvements which enhance the signal transmission characteristics of such electrical circuits, especially in the high frequency region of the band of operation thereof.

Distributed inductance, such as may exist in the lead conductors of the electrical components, can have an adverse effect upon the signal transmission characteristic of an electrical network, especially at high frequencies. At low frequencies, the inductive reactance introduced by distributed inductance in the network is generally negligible. This invention is designed to counteract the effects of distributed inductance without disturbing the operation of a circuit in which it is utilized.

Although not restricted thereto, the present invention finds extensive application in wide band attenuator networks, which will be referred to herein as attenuators for purposes of brevity. Such attenuators are used in many types of electrical apparatus which operate with signals varying in frequency over a wide range of frequencies. It is conventional to use an attenuator in the input end of testing and measuring equipment, such as vacuum tube voltmeters and oscilloscopes. Attenuators used in such applications may consist of capacitors and resistors connected together to achieve proper frequency compensation so as to provide uniform attenuation over a reasonably wide band of frequencies. Such attenuators normally operate as voltage dividers that are capacitive at the high frequency end of the band of operating frequencies and resistive at the lower frequency end of the band.

It has been found that the distributed inductance which may be attributed to the lead conductors of the capacitors having the larger values of capacitance has a decided adverse effect. At high frequencies, the value of reactance of the distributed inductance and the reactance of the large capacitance may be equal, thus producing series resonance. This resonance commonly occurs at a frequency within the desired frequency range or pass band of the attenuator. The result is non-uniform attenuation at all frequencies where the inductive reactance is appreciable relative to the capacitive reactance.

Large amounts of attenuation at high frequencies requires large capacitors. Thus, the amount of attenuation that is available over a broadband of frequencies with a single stage of attenuation has been limited. It was heretofore necessary to provide several stages of attenuation to achieve the required attenuation over the desired frequency band.

Consequently, it is an object of the present invention to provide an improved attenuator network.

It is a still further object of the invention to provide an improvement in electrical circuits whereby adverse effects of distributed inductance may be eliminated.

It is a further object of the present invention to provide improved electrical circuits in which stray distributed inductance, such as may be caused by lead conductors of components therein, may be eliminated.

It is a still further object of the present invention to provide an improved attenuator in which the effects of stray inductance is eliminated thereby permitting successful operation thereof over a wide band of frequencies with a single stage of attenuation.

Briefly described, a circuit designed in accordance with the present invention includes a coil connected between the input and output of the circuit. A section of this coil is connected in the path of current flow through the circuit components having excessive distributed inductance. With respect to these components, the coil functions as a transformer. By transformer action, a voltage is developed by the coil which counteracts the voltage developed from this same current due to distributed inductance of the components. Consequently, the net output voltage from the circuit will not include the voltage across the distributed inductance. The effects of the distributed inductance are thereby eliminated. The coil has no adverse effects on the circuit in which it is used in that the reactance exhibited thereby is negligible in that part of the circuit in which it is located. Thus, the present invention features a convenient and desirable means for counteracting and eliminating the adverse effects of stray inductance in a circuit.

Figure 2:
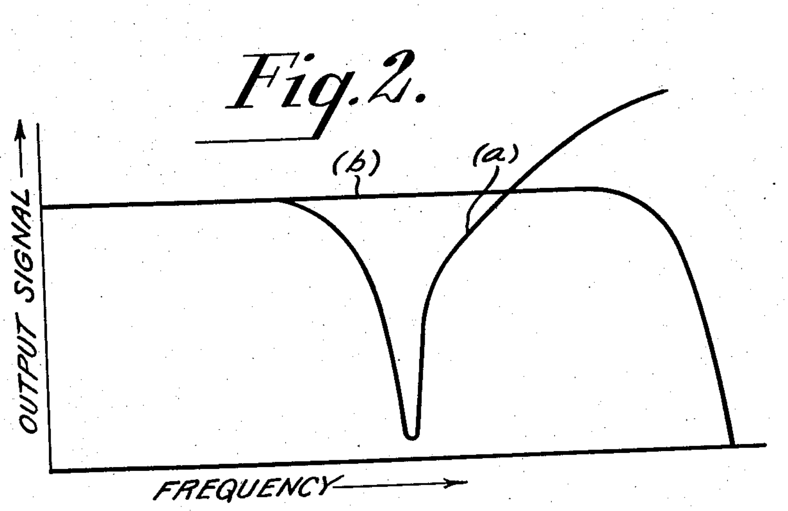

The above-mentioned and other objects of the present invention will, of course, become apparent and immediately suggest themselves to those skilled in the art to which the invention is directed from a reading of the following specification in connection with the accompanying drawing in which:

Fig. 1 is a simplified schematic diagram of an attenuator circuit for testing and measuring equipment which is designed to incorporate the present invention; and Fig. 2 is a curve of the signal transmission characteristic of the attenuator circuit showing the improvements afforded by the present invention.

Referring to Fig. 1, there is schematically shown a high frequency test probe 10. This probe has a prong 12 which functions as an external circuit contacting point. The prong 12 is connected through a resistor 14 that is shunted by a capacitor 15. The resistor 14 is normally of a high value of resistance in the order of megohms, whereas the capacitor 15 is normally of a small value of capacitance in the order of a micro-micro-farad. One plate of the capacitor 15 may be the conductor leading from the prong 12 to the resistor 14 and another plate of the capacitor 15 may be formed by a cylindrical conductor surrounding the conductor leading from the prongs. The case for the probe conventionally includes a shield which is grounded, as indicated. Since the probe is designed to carry high frequency signals, a shielded cable 17 may be used to connect it to the remainder of the circuit.

The remainder of the circuit may be included in the testing and measuring equipment. The input terminal 16 of the remainder of the circuit is connected to an air core coil 20. The other end of the coil 20 is connected to the output of the attenuator. A tap 22 on the coil 20 is connected to a circuit including a capacitor 23 and a resistor 24; the capacitor 23 and the resistor 24 also being connected to ground. Ground as referred to herein, includes any common voltage reference point.

The output of the attenuator is connected to the input terminal 18 of an amplifier 29. This terminal 18 is connected through a blocking capacitor 21 to the grid circuit of the first stage of the amplifier 29 which is designated schematically herein because of its conventional design. This grid circuit includes a grid resistor 26 and a bias battery 27.

The resistor 14 and the capacitor 15 located within the probe 10 form a series arm 5 of the attenuator. The capacitor 23, resistor 24 form the shunt arm 6 of the attenuator. Several combinations of resistors and capacitors, connected in the same manner as the resistors 24 and the capacitor 23 but having values different therefrom may be included in the equipment to provide various ranges of attenuation.

It may be observed that the series and shunt arms 5 and 6 of the attenuator operate to provide a voltage divider. In order to achieve the required attenuation ratio, the impedance of the shunt arm 6 will normally be much lower than the impedance of the series arm 5. For example, an attenuation ratio of 100 to 1 may be required; that is, the voltage developed across the shunt arm 6 must be one hundredth that of the voltage applied to the tip 12 of the probe 10. The ratio of the impedance of the shunt arm 6 with respect to the impedance of series arm 5 added to the impedance of the shunt arm 6, should be 1:100. In order to have a uniform frequency response over a wide range of frequencies, this impedance ratio must be maintained over the entire range of frequencies. It is conventional to incorporate resistor and capacitor arms as indicated to provide proper compensation so that the same attenuation ratio may be maintained over a wide range of frequencies. For proper compensation, the product of the resistance and the capacitance of the elements 14 and 15 in the series arm 5 should equal the product of the resistance and capacitance of the elements 23 and 24 in the shunt arm 6.

The distributed inductance due to the lead conductors of the capacitor 23 is represented schematically by the inductor 30 shown by the dashed lines as being connected in series with the capacitor 23. As mentioned previously, this inductor and the capacitor 23 form a series circuit which is resonant at a frequency which may be within the desired band pass of the attenuator. At this frequency, the effective impedance of the shunt arm 6 is a very small resistance. The attenuation ratio at around and above the frequency of resonance is greatly altered; the attenuation being ordinarily greatly increased at resonance due to the small effective impedance of the shunt arm 6. The adverse effects of this condition is indicated by the curve indicated by the letter (*a*) in Fig. 2. It will be observed that the output signal amplitude drops off sharply around the frequency at which resonance occurs because of the increase in attenuation. Thus, the band width over which the attenuator may operate properly is sharply limited because of the lead inductance 30. Moreover, it may be observed from curve (*a*) of Fig. 2 that the attenuation at frequencies well above the frequency at which resonance occurs is not constant as desired, but decreases as frequency increases. This effect is attributable to the inductive reactance due to the distributed inductance 30 being larger than capacitive reactance of the capacitor 23. Should it be desired to provide an attenuator designed for a band of frequencies not including low frequencies and beyond the frequency of the aforementioned resonance effect, the effects of the distributed inductance would need to be eliminated.

In this embodiment of the present invention, the coil 20 is included in order to counteract and eliminate the effects of the distributed inductance 30.

The coil 20 may be a solenoid coil of successive turns wound in the same sense and provided with a center-tap. Alternatively, the coil 20 may be provided by bifilar windings. The portion of the coil 20 between the terminal 16 and the center tap terminal 22 thereon functions as the primary of a transformer, and the portion between the center tap terminal 22 and the terminal 18 functions as the secondary of the transformer. Should a bifilar winding be utilized, one of the windings would function as transformer primary and the other as the secondary. The junction connecting the windings would be connected to the terminal 22. The dots located immediately above the first and center turn of the coil 20 indicate that the instantaneous polarity of the voltage at these points is identical when referenced to terminal 18.

The signal current passes through the primary section of the coil 20 on its way to the shunt arm 6 of the attenuator. A voltage is developed across the primary section of the coil 20, as measured from the terminal 16 to the tap terminal 22, which is of the same instantaneous polarity as the voltage across the distributed inductance 30, as measured from the tap terminal 22 to the end of the equivalent distributed inductance 30 connected to capacitor 23. The coil 20 is designed and center tapped so that the voltage drop across the primary section of the coil is equal in magnitude to the voltage drop across the distributed inductance 20. This voltage, which is developed across the primary section of the coil 30, is induced by transformer action into the secondary section of the coil 20. Due to the sense of the winding in the coil 20, the voltage across the secondary section thereof is in phase opposition to the voltage across the distributed inductance 30. The output voltage of the attenuator, as measured from the terminal 18, will not include the voltage across the distributed inductance 30. The voltage across the distributed inductance 30 and thereby the adverse effects of this inductance is counteracted and eliminated.

The exact number of turns for the coil, it has been found, may be chosen experimentally. By observing the signal transmission characteristic of the attenuator on an oscilloscope, and by adding or deleting turns from the coil 20, the exact number of turns is obtained to provide uniform attenuation.

The coil 20 is very small and normally provides only a very small inductive reactance at any frequency within the pass band of the attenuator. The primary section of the coil 20 establishes an inductive reactance that is many times smaller than the reactance of the capacitor 15 of the series arm 5 in the attenuator at any frequency in the pass band. Thus, the primary section of the inductor 20 has a negligible effect on the rest of the circuit at all frequencies.

The capacitor 21 operates as blocking capacitor having such high value of capacitance as to introduce negligible reactance at all frequencies of operation. It merely serves to block the direct current component of signals applied to the grid of the amplifier 39 in the illustrative embodiment of this invention.

Curve B of Fig. 2 shows the improved response on the signal transmission characteristic of the attenuator when the invention is incorporated. It may be observed that the pass band is extended and the attenuation is uniform over a much wider band of frequencies than heretofore possible. Although the above has described a center tapped inductance, any turns ratio may be used as long as the voltage developed across the secondary is equal to that across the distributed inductance. For instance, the primary inductance might be one-half that of the distributed inductance and a one to two turns ratio, primary to secondary, would then be used to obtain the proper voltage across the secondary.

The utilization of the transformer action of a coil, in accordance with the invention, may provide similar improvements in other circuits wherein there are unwanted inductance effects.

What is claimed is:

1. An attenuator comprising a series arm and a shunt arm, a coil having two serially connected winding sections having turns wound in the same sense, the number of turns in the first of said sections bearing a given relationship to the number of turns in the second of said sections said coil being adapted to reflect the voltage across said first section across said second section thereof such that the polarity of the voltage at the opposite ends of said coil is reversed, said first section being connected in series with said shunt arm and said series arm, said second section being connected between said shunt arm and the output of said attenuator, and said first section being adapted to develop a voltage equal to a predetermined fraction of the voltage across said shunt arm.

2. A wide band attenuator comprising an input terminal adapted to receive signals to be attenuated, an output terminal adapted to be connected to a load circuit, an arm series connected between said input and said output terminals, said series connected arm including a resistor and capacitor connected in parallel, a coil having a center tap connected in series with said parallel connected resistor and capacitor to said output terminal, another arm connected to said output terminal through said coil by connection to said center-tap thereof, said other arm also being connected to a point in said attenuator at reference voltage, and said other arm including a capacitor and a resistor, said capacitor in said other arm being of a larger value than the capacitor in said series connected arm and said resistor in said other arm being of a smaller value than said resistor in said series connected arm, said coil being adapted to develop in the section of said coil disposed between said series connected arm and said center-tap, a voltage equal to a predetermined fraction of the voltage across said capacitor in said other arm, said developed voltage being equal to the voltage across the distributed inductance in said other arm, whereby said developed voltage is induced into said section of said coil between said center-tap and said output terminal to counteract the voltage across said distributed inductance.

3. In an electrical circuit, said circuit having an input arm and an output arm, a transformer having an input side and an output side, said input arm and said output arm of said circuit being connected in series with said input side, said output side being connected to the junction of said input side and said output arm and being polarized with respect to said input side so that voltages of like polarity are induced in said output side in response to input signal voltages applied to said input arm, said input side having a predetermined impedance characteristic to develop a voltage in response to said input signal voltage equal to a predetermined fraction of the voltage across said output arm, and means for deriving an output signal across said output arm and said output side.

4. An electrical circuit comprising one arm connected between the input and the output thereof, another arm connected across the output thereof, a circuit component having two sections, said component having circuit characteristics to reflect voltages developed across the first of said sections across the second of said sections, said first section providing a connection between said one arm and said other arm, said second section being connected between the junction of said first section and said other arm and said output and polarized with respect to said first section such that the polarity of the reflected voltage across said second section at said output is opposite to the polarity of the voltage across said first section at said input, said first section having a certain impedance to develop a voltage equal to a predetermined fraction of the voltage developed across said other arm in response to voltage applied to said input, and said voltage reflected across said second section thereby being polarized with respect to the voltage across said other arm so that it counteracts said predetermined fraction of said voltage developed across said other arm when measured at said output.

References Cited in the file of this patent

UNITED STATES PATENTS

| | | |
|---|---|---|
| 2,587,294 | Dorbec | Feb. 26, 1952 |
| 2,685,673 | Avins | Aug. 3, 1954 |
| 2,733,414 | Lansil | Jan. 31, 1956 |

OTHER REFERENCES

Rounds et al.: Bell System Technical Journal, vol. 34, No. 4, July 1955, pages 725–728.